(12) United States Patent
Schlanger

(10) Patent No.: US 7,784,378 B2
(45) Date of Patent: Aug. 31, 2010

(54) BICYCLE CRANK ASSEMBLY

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 1160 days.

(21) Appl. No.: 11/273,776

(22) Filed: Nov. 15, 2005

(65) Prior Publication Data

US 2006/0103106 A1    May 18, 2006

Related U.S. Application Data

(60) Provisional application No. 60/628,773, filed on Nov. 17, 2004.

(51) Int. Cl.
*B62M 3/00* (2006.01)
(52) U.S. Cl. ..................................... 74/594.1
(58) Field of Classification Search ................ 74/594.1, 74/594.2
See application file for complete search history.

(56) References Cited

U.S. PATENT DOCUMENTS

| | | | | | |
|---|---|---|---|---|---|
| 3,039,791 | A | * | 6/1962 | Horowitz et. al. | 280/259 |
| 5,233,885 | A | * | 8/1993 | Lin et al. | 74/594.1 |
| 5,493,937 | A | * | 2/1996 | Edwards | 74/594.1 |
| 5,624,519 | A | * | 4/1997 | Nelson et al. | 156/245 |
| 5,941,135 | A | * | 8/1999 | Schlanger | 74/594.1 |
| 6,443,033 | B1 | | 9/2002 | Brummer et al. | |
| 6,581,494 | B2 | * | 6/2003 | Sechler | 74/594.1 |
| 6,983,672 | B2 | * | 1/2006 | Smith | 74/594.1 |
| 7,267,030 | B2 | * | 9/2007 | French | 74/594.1 |
| 2005/0022625 | A1 | * | 2/2005 | Nonoshita | 74/594.1 |

* cited by examiner

*Primary Examiner*—Vicky A Johnson

(57) ABSTRACT

An improved bicycle crankshaft assembly, including a crank axle with an axial axle axis, a first axle end, and a second axle end axially opposed to the first axle end; a first crank arm connected to the crank axle at a first crank arm interface adjacent the first axle end; a second crank arm connected to the crank axle at a second crank arm interface axially spaced from the first crank arm interface; a first bearing surrounding said crank axle adjacent said first axle end for rotation of said crank axle about said axial axis; a second bearing surrounding the crank axle and axially spaced from the first bearing. The crank axle includes reinforcement fibers for structural reinforcement of the crank axle and the crank axle is an integral crank axle that simultaneously contacts both the first bearing and the second bearing.

41 Claims, 10 Drawing Sheets

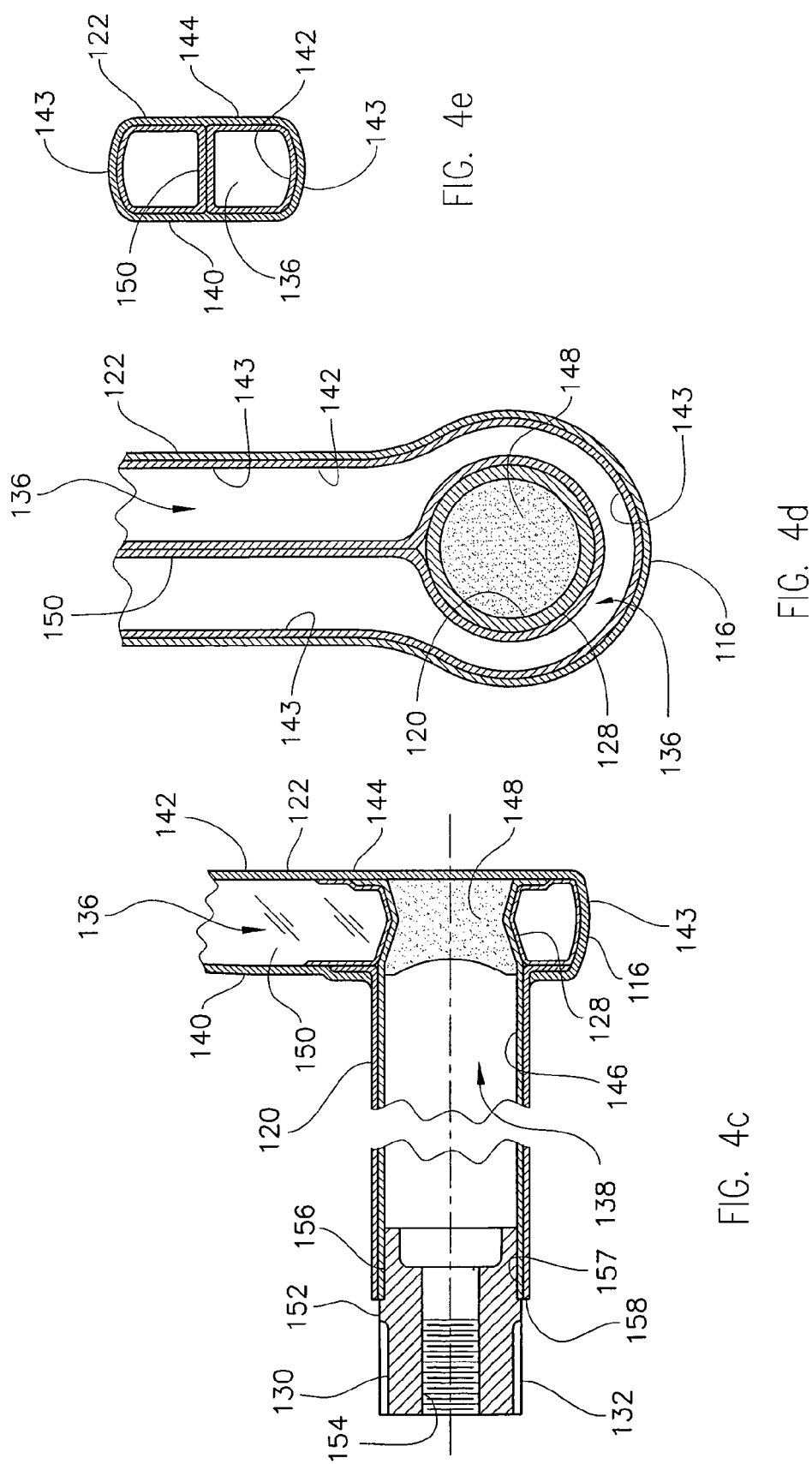

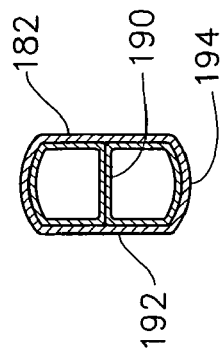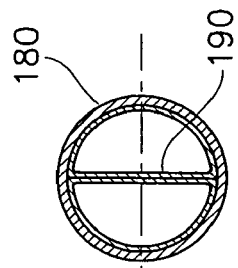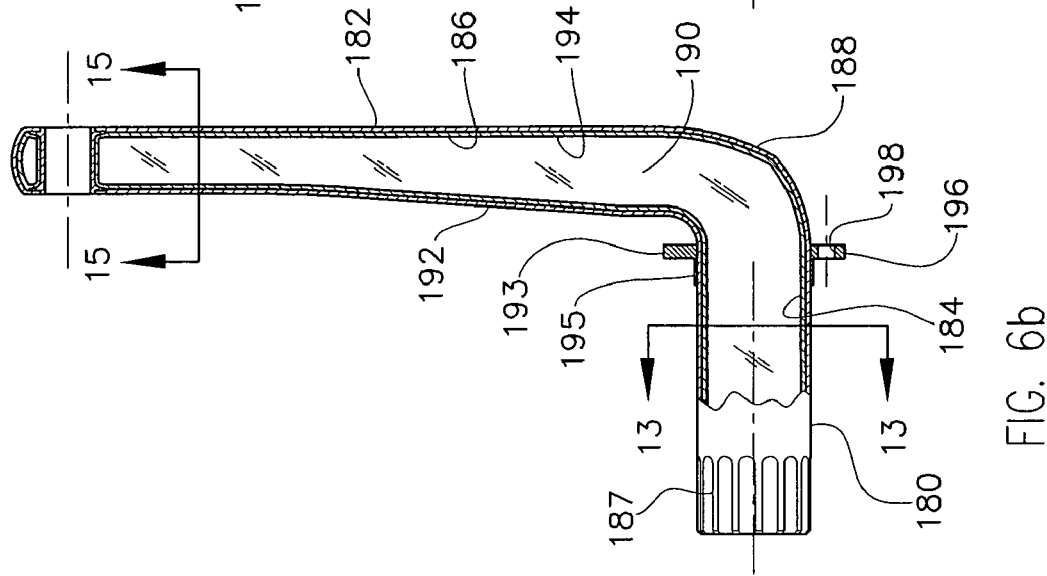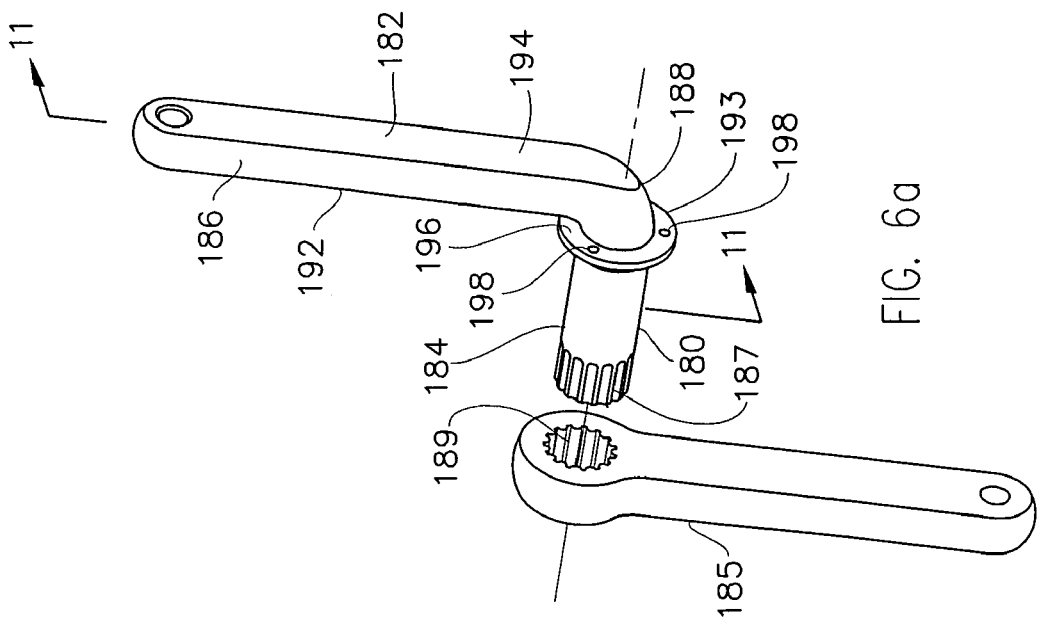

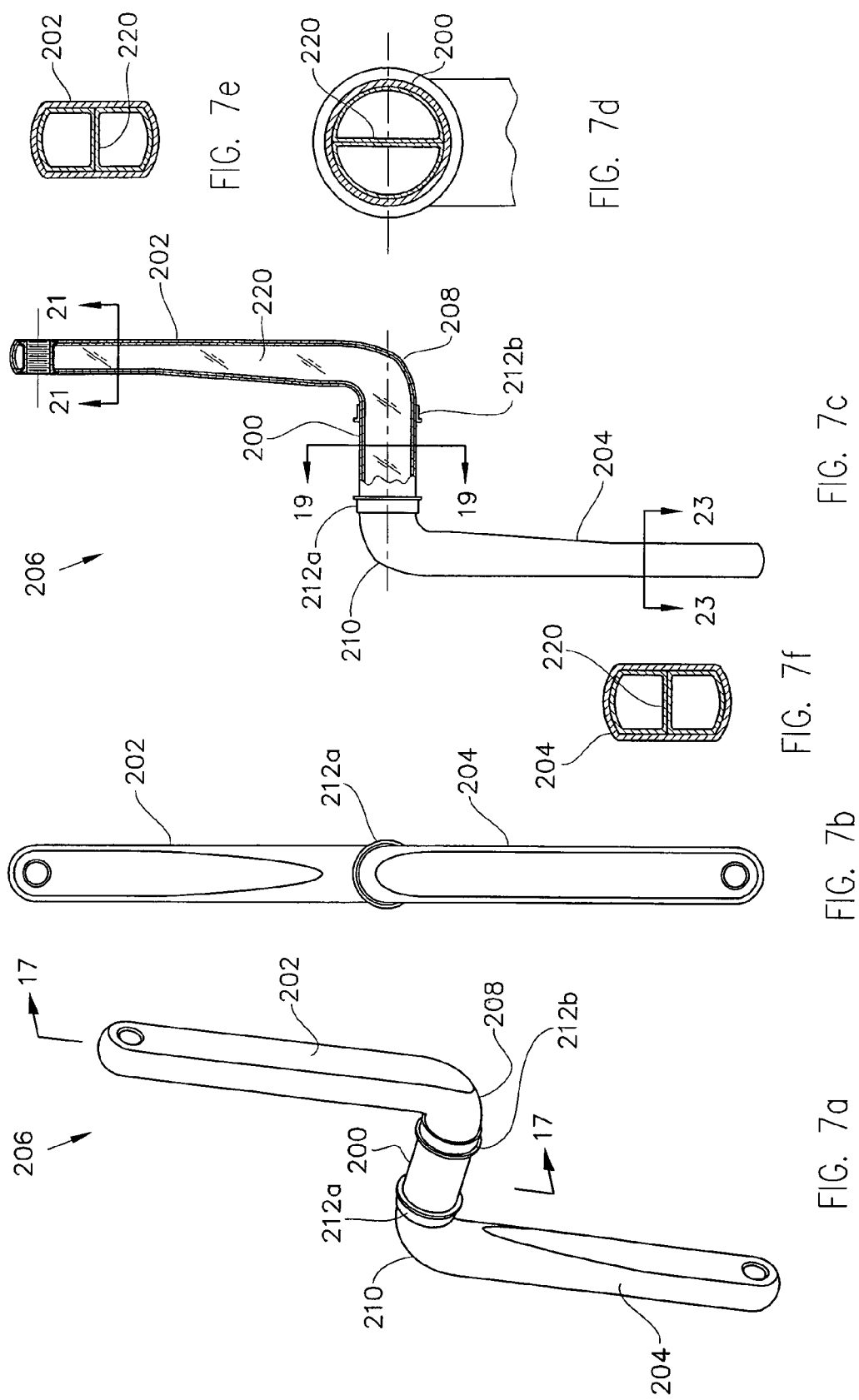

BICYCLE CRANK ASSEMBLY

CROSS-REFERENCE TO RELATED APPLICATION

This application claims priority of U.S. provisional patent application 60/628,773, filed Nov. 17, 2004, and entitled "Crank Axle Assembly".

BACKGROUND OF THE INVENTION (1) Field of the Invention

This invention is related to the crank axle of a bicycle crank assembly and is particularly related to a crank axle of fiber-reinforced construction and to the connection between a fiber-reinforced crank axle and a crank arm.

(2) Description of the Related Art

A bicycle crank assembly or crankset has traditionally been designed as a 3-piece assembly consisting of a crank axle, a left crank arm, and a right crank arm. The left crank arm is connected to the left end of the crank axle via a system of straight and/or tapered splines in combination with a fixing bolt to secure the connection. Likewise, the right crank arm is connected to the right end of the crank axle in a similar arrangement. The crank axle is radially supported and axially located by two axially spaced bearing assemblies that are located axially inboard of the crank arms. The drive sprockets, or chainrings, are mounted to the right crank arm via a "spider", which consists of a series of radial arms extending between the chainring and the axle end of the right crank arm. The crank axle is generally made of steel, while the crank arms are usually of solid aluminum construction.

More recently, some state-of-the-art designs are arranged such that the steel crank axle is permanently fixed to the right crank arm. In addition, some high-end crank arms utilize carbon fiber reinforced material in their construction. However, these crank assemblies still utilize crank axles made of steel, which is a very high-density material, and results in a crank axle that is quite heavy.

There have been some prior art cranksets that utilize a split crank axle, where a left crank axle portion is removably connected to a right crank axle portion at a connection interface that is located axially inboard from the two supporting bearings. In such designs, the left crank arm is integrally joined to the left crank axle portion and the right crank arm is integrally joined to the right crank axle. Such a connection may be considered a structural interruption of the crank axle and this type of design places this connection at a very highly stressed region of the crank axle, which may result in a weaker and/or heavier connection. Additionally, this region also has severe geometric constraints due to the surrounding bottom bracket shell (not shown) of the bicycle frame. This serves to limit the structural geometry necessary to create a strong and lightweight connection. Further, since the region of connection is completely enclosed by the bottom bracket shell and the bearings, access and means to operate the connection are severely limited. This results in further constraints on the design of this connection and further limits the ability to create a rigid, strong and lightweight connection. Needless to say, such designs have had only limited success in the marketplace.

In addition, the connection between the crank arm(s) is somewhat complex and requires the expense of precision machining and additional manufacturing steps to achieve a reliable connection. Further, this connection requires additional components, such as fixing bolt(s), which add cost and weight to the overall assembly.

Further objects and advantages of the present invention will appear hereinbelow.

SUMMARY OF THE INVENTION

In accordance with the present invention, it has now been found that the forgoing objects and advantages may be readily obtained.

Bicycle racers and cycling enthusiasts are in a constant quest to increase the performance of their equipment by reducing its weight. This is well known in the field and is particularly applicable to the rotating components of the bicycle such as the crankset. It is an object of the present invention to provide a bicycle crank assembly that is light in weight, preferably lighter than traditional crank assemblies, while maintaining the requisite structural integrity. It is a further object of the present invention to produce a lightweight crank assembly that can be produced economically to minimize any additional expense associated with the increase in performance.

The present invention utilizes a crank axle that is constructed, at least in part, from fiber reinforced composite materials that are high in strength and light in weight. This type of material is highly advantageous in a crank axle application. In addition, it is preferable that the crank axle and at least one of the crank arms be molded as one contiguous unit.

Fiber reinforced composite materials possess very favorable structural properties, such as very high strength and stiffness, while having a much lower density than most metals. Thus, a well-designed crank axle that utilizes composite materials may be much lighter than a comparable steel crank axle, while maintaining, or increasing, the requisite structural properties.

In operation, as the pedals of the bicycle are rotated in their circular cycle, the orientation of the crank arms and the loads on the pedals are constantly changing. Therefore, the crank axle experiences bending stresses in multiple directions, as well as torsional stress. By carefully orienting the fiber reinforcement of the crank axle, it is possible to adjust the structural properties of the finished crank axle to be highly optimized for the loading and stresses unique the crank axle application. This permits the structural properties to be optimized while minimizing material usage, thereby further reducing the weight and cost of the crank axle.

The present invention includes embodiments where the crank axle is formed as a contiguous unit with one or both of the crank arms. In comparison with conventional crank assemblies, the present invention may be easily adapted to this type of arrangement. Because the composite material is highly moldable, it is relatively easy to create the geometry required to create such a contiguous crank arm and crank axle. Such geometry would be far more difficult to achieve using metal construction. Further, because the crank axle may be constructed from layers or plies of composite material, these layers may be interleaved with the plies of a composite crank arm to create a high strength and lightweight contiguous connection between these two components.

Further, the present invention describes a hollow crank arm and a hollow crank axle. It is well understood that, by locating the structural material away from the neutral axis, a hollow crank arm and/or crank axle may be significantly stronger and lighter than a corresponding solid component as utilized in conventional crank assemblies.

In contrast to split crank axle designs, the present invention utilizes a crank axle that spans between the two axially spaced supporting bearings without structural interruption. In embodiments where a removable connection is required, such as the connection between the crank arm and an extending end portion of the crank axle, this is accomplished outside of the confines of the bottom bracket shell. Therefore the aforementioned geometric constraints of an enclosed connection do not exist and a robust and lightweight connection may be achieved. Further, since the crank axle is not split, the fibers may be continuous and may extend between the bearings, which allows the present invention to take full advantage of the mechanical properties of this material, while minimizing the amount of material (and weight) required.

The contiguous crank arm and crank axle embodiments of the present invention also serve to eliminate the "doubling" geometry of a conventional crank assembly where crank arm is overlapping the end of the crank axle, resulting in a comparatively heavy double wall to effect the crank arm-to-crank axle connection. Further, the contiguous crank arm and crank axle unit of the present invention eliminates the fixing bolt and related hardware of conventional crank assemblies, thereby eliminating their associated weight and expense. Still further, the splined connection between the conventional crank arm and crank axle assembly require a precision fit. The fabrication involved in this precision fit, as well as the machining to accept the fixing bolt adds expense to the conventional assembly. This cost is eliminated in contiguous crank arm and crank axle unit of the present invention.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1b is a radial plan view the general configuration of the crank axle of FIG. 1a;

FIG. 4a is a perspective exploded view of an additional embodiment of the present invention, schematically illustrating the assembly of an integral right crank arm and crank axle component with a left crank arm component;

FIG. 4b is a radial plan view of the assembly of FIG. 4a;

FIG. 4c is a partial cross section view of the embodiment of FIG. 4a as seen generally in the direction 5-5 of FIG. 4a;

FIG. 4d is a partial cross section view of the embodiment of FIG. 4a as seen generally in the direction 7-7 of FIG. 4b;

FIG. 4e is a partial cross section view of the embodiment of FIG. 4a as seen generally in the direction 9-9 of FIG. 4b;

FIG. 6a is a perspective exploded view of an additional embodiment of the present invention, schematically illustrating the assembly of an integral right crank arm and crank axle component with a left crank arm component;

FIG. 6b is a radial cross-sectional view of the integral right crank arm and crank axle component of FIG. 6a as seen generally in the direction 11-11 of FIG. 6a;

FIG. 6c is a partial cross section view of the embodiment of FIG. 6a as seen generally in the direction 13-13 of FIG. 6b;

FIG. 6d is a partial cross section view of the embodiment of FIG. 6a as seen generally in the direction 15-15 of FIG. 6b;

FIG. 7a is a perspective view of an additional embodiment of the present invention, schematically illustrating an integral right crank arm and crank axle and left crank arm component;

FIG. 7b is an axial plan view of the integral crank embodiment of FIG. 7a;

FIG. 7c is a radial plan view of the integral crank assembly of FIG. 7a, shown in partial cross section as seen generally in the direction 17-17;

FIG. 7d is a partial cross section view of the crank axle of FIG. 7a as seen generally in the direction 19-19 of FIG. 7c;

FIG. 7e is a cross section view of the right crank arm of FIG. 7a as seen generally in the direction 21-21 of FIG. 7c;

FIG. 7f is a cross section view of the left crank arm of FIG. 7a as seen generally in the direction 23-23 of FIG. 7c;

DETAILED DESCRIPTION OF THE INVENTION

Figure 1A:
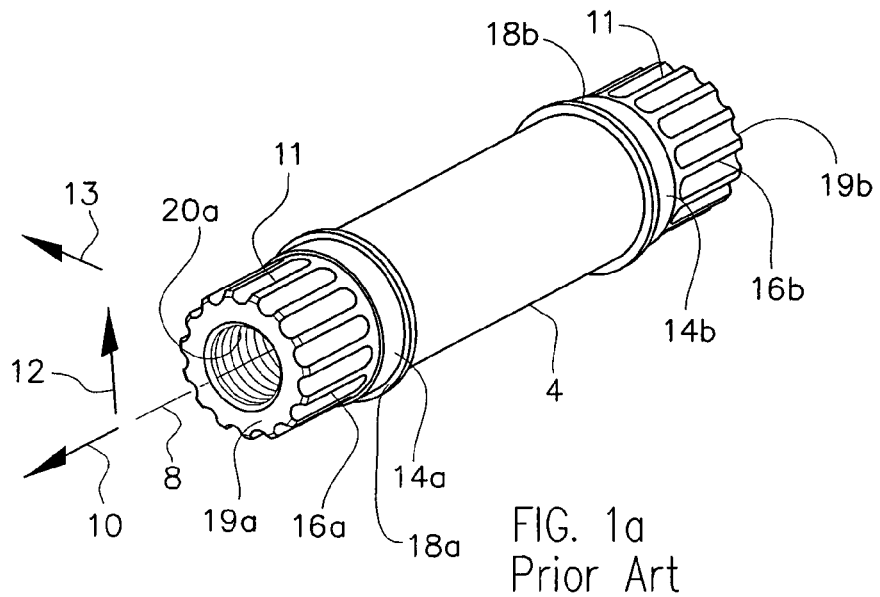
FIG. 1a is a perspective view schematically illustrating the general configuration of a crank axle.
Figure 1B:
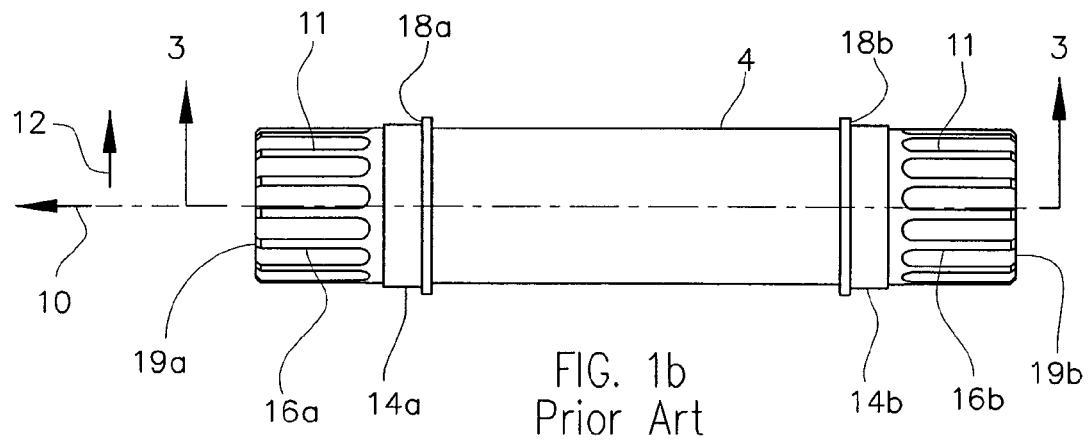
Figure 1C:
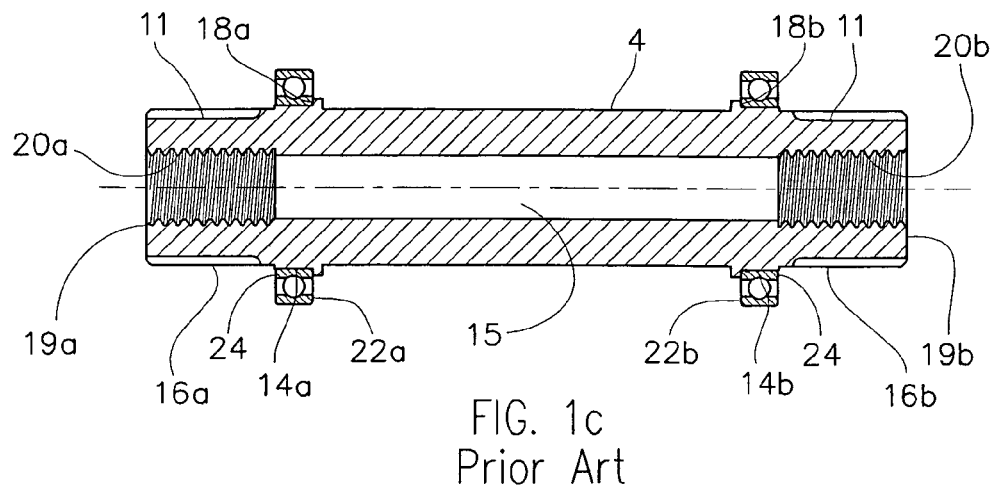
FIG. 1c is a cross-section view of the crank axle of FIG. 1a as seen generally in the direction 3-3 of FIG. 1b, including bearings.

FIGS. 1a-c describe a prior art crank axle 4. For the sake of orientation convention, the crank axle 4 may be considered as a generally cylindrical component that has a longitudinal or axial axis 8 about which it rotates. The axial direction 10 is a direction parallel to the axial axis 8. The radial direction 12 is a direction extending radially and perpendicular to the axial axis 8. The tangential direction 13 is a direction tangential about the axial axis 8 at a radial distance from the axial axis 8. The term "axially inboard" refers to an axial location proximal to a point on the axial axis 8 that is generally midway between bearing surfaces 14a and 14b. Conversely, the term "axially outboard" refers to an orientation that is distal from this point. Similarly, "radially inboard" refers to an orientation proximal to the axial axis 8 and "radially outboard" refers to an orientation distal to the axial axis 8.

Crank axle 4 has relatively conventional geometry and includes splined portions 16a and 16b with splines 11 that extend axially for mating with crank arms (not shown) in the conventional manner. Cylindrical bearing surfaces 14a and 14b are surfaces that are adapted for fitment of bearing assemblies 22a and 22b respectively. Bearing surfaces 14a and 14b may be designed to serve directly as inner bearing races or they may be adapted to fit an inner bearing race 24 of a bearing assembly 22a and/or 22b (as shown in FIG. 1c). It is understood that bearing surfaces 14a and 14b may possess any geometry or profile contour that is beneficial to adapt to their specific bearing application. In FIG. 1b, these bearing surfaces 14a and 14b are shown to be cylindrical surfaces, with corresponding shoulders 18a and 18b for axial location of mating bearing assemblies 22a and 22b that are shown here to be of the cartridge bearing type. Crank axle 4 includes end faces 19a and 19b and internally threaded bores 20a and 20b for threadable mating with crank fixing bolts (not shown) that serve to fasten the respective crank arms to the crank axle 4 in the conventional manner. Crank axle 4 is shown here to be of hollow cylindrical geometry, including a through bore 15, which is the preferred design. Conventional crank axles 4 are usually constructed of steel material, which tends to be quite heavy.

It is understood that the crank axle 4 depicted in FIGS. 1a-c is of a representative crank axle geometry that is utilized elsewhere in this specification. However, the requirements of a specific application may require adaptation of wide range of crank axle geometries not specifically described here. In general, a crank axle need only be a generally cylindrical element with provision for mounting two axially spaced crank arms and provision for at least two axially spaced bearings. Alternatively, splined portions 16a and 16b may have a wide range of geometries adapted for connection with a crank arm such that rotational torque may be transmitted between the crank axle and the mating crank arm. Also, bearing surfaces 14a and 14b may also have a wide range of geometries adapted to facilitate easy rotation of the crank axle 4. Threaded bores 20a and 20b are simply provided as a representative means to secure a crank arm to the crank axle 4 and a wide range of alternative means may be envisioned.

Figure 1D:
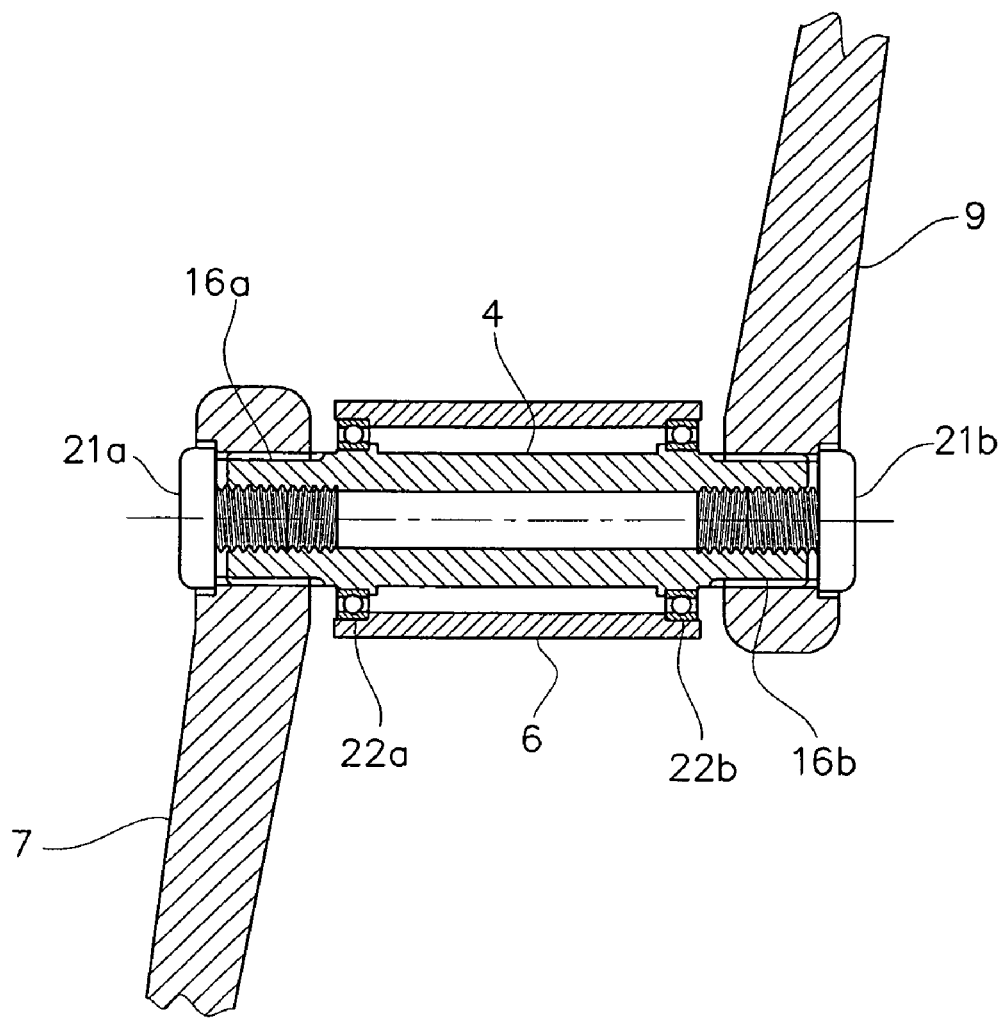
FIG. 1d is a partial cross section view showing the crank axle of FIGS. 1a-c, as assembled with bearings, crank arms and bottom bracket shell.

FIG. 1d shows a typical assembly of the crank axle 4 of FIGS. 1a-c with two axially spaced bearing assemblies 22a and 22b that are mounted within a bottom bracket shell 6 of the bicycle frame (not shown). Left crank arm 7 is rotationally engaged to the left end of the crank axle 4 via splined portion 16a and secured in place by the fixing bolt 21a. Left crank arm 7 is thus axially and rotationally locked to crank axle 4. Similarly, right crank arm 9 is engaged to the right end of the crank axle 4 via splined portions 16b and secured in place by the fixing bolt 21b.

Figure 2A:
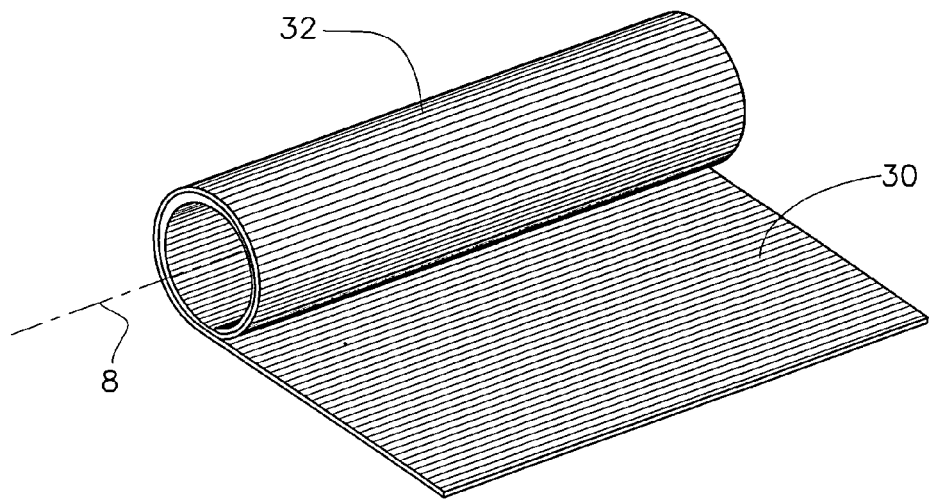
FIG. 2a is a perspective view schematically illustrating the fiber alignment of a tubular fiber-reinforced molding charge.
Figure 2B:
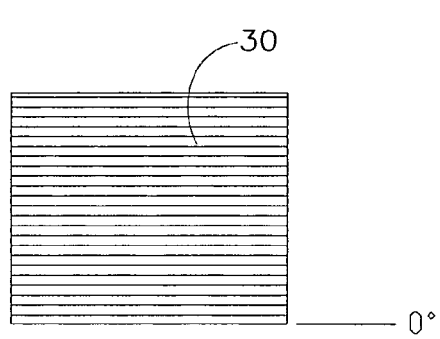
FIGS. 2b-e are diagrammatic views, describing fiber reinforcement and illustrating fiber orientations of 0°, 90°, 45° and 135° respectively.
Figure 2C:
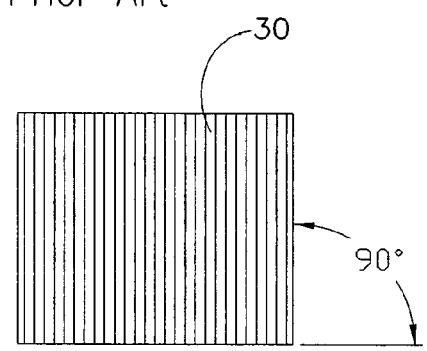
Figure 2D:
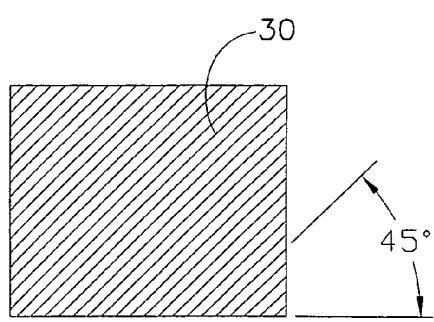
Figure 2E:
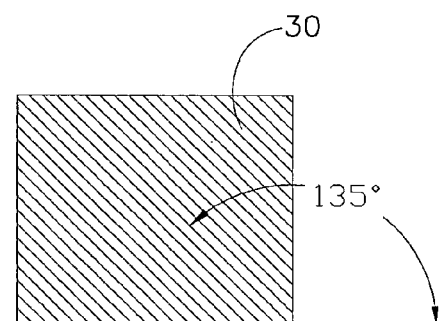

In the case of fiber-reinforced components, it is generally understood that fiber orientation plays a large role in the structural performance of the component. Fiber-reinforced components generally have greater strength and stiffness in a direction parallel to the alignment of the fibers and lesser strength and stiffness in a direction perpendicular to the alignment of the fibers. Therefore it is preferable to orient the fibers in one direction or in several directions to optimize the structural performance for the final intended end use of the product. The example shown in FIGS. 2a-e shows how a cylindrical component, such as a crank axle, may be constructed or formed from multiple layers or plies of fiber-reinforced material of a variety of fiber orientations. As an example for illustration purposes, FIG. 2a shows how a cylindrical shape may be created by rolling plies or flat fiber reinforced sheet 30 into a cylindrical pre-form 32 that may subsequently be molded to create the corresponding cylindrical crank axle as described in FIGS. 3a-e.

FIG. 2a shows the reinforcement fibers of the fiber-reinforced sheet 30 to be oriented at 0°, since these fibers are parallel to the axial axis 8. Additionally or alternatively, a wide range of fiber orientations may be utilized, as illustrated in FIGS. 2b-e. In this example, the 0° fibers of FIG. 2b will tend to impart bending strength and axial tensile strength to the crank axle 4. The 90° fibers of FIG. 2c will tend to impart hoop strength and crush strength to the crank axle 4. The 45° and 135° fibers of FIG. 2d and FIG. 2e will tend to impart bi-directional torsional strength to the crank axle 4. Several fiber-reinforced sheets of a variety of fiber orientations may be laminated or woven together to create an optimized combination of properties. For a crank axle 4 application it is advantageous to include fibers in a generally 45° and 135° orientation. This aligns the fibers in a helical orientation to provide the requisite torsional strength and stiffness for a crank axle application.

The example shown in FIG. 2a show a "roll-wrapping" technique, which is merely one example of a fabrication technique shown here merely to illustrate the importance of fiber orientation. In FIGS. 2a-d, the fiber-reinforced sheet 30 is shown to be a "prepreg" sheet of reinforcing fiber that is pre-combined with uncured resin. Alternatively, a wide range of fiber types, fiber-reinforced starting materials, fiber lengths, fiber orientations and fabrication processes may be employed to construct a fiber-reinforced component.

Figure 3A:
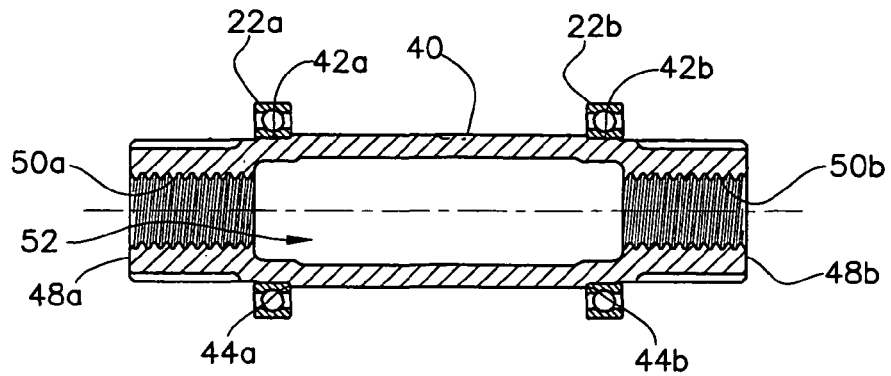
FIG. 3a is a cross-section view of a crank axle of fiber-reinforced material, including bearings.

FIG. 3a shows crank axle 40 that is constructed entirely of fiber-reinforced material, which has excellent structural properties and is has a significantly lower density than steel for a significant reduction in weight. It is preferable that the fiber-reinforced material consist of fibers in a polymer resin matrix, where the matrix serves to bind the fibers together and also to transmit shear loads between adjacent fibers. It is generally understood that longer fibers result in greater structural performance in comparison to shorter fibers. Thus it is also preferable that these fibers be generally continuous, rather than discontinuous or "short" fibers, thereby providing a strength advantage. It is further preferable that these fibers be characterized as high-strength fibers, such as carbon fibers, aramid fibers, liquid-crystal fibers, PBO fibers, etc. Of these fiber types, carbon fibers generally possess the best performance characteristics for this application. The resin matrix may be a thermoset resin, such as epoxy or vinylester or it may be a thermoplastic resin such as polyamide, polyester or any of a wide range of available thermoplastic resins. Fiber reinforced materials as described here may also be termed "composite" material or, in the case where high-strength fibers are used, they may also be termed "advanced composite". There is a wide range of manufacturing processes by which a fiber reinforced crank axle may be produced. These processes are well known in industry and may include filament winding, roll wrapping, resin transfer molding, bladder molding, compression molding, prepreg layup, wet layup, among others. However, it should also be understood that these advanced composite materials are on the cutting edge of technology and new fibers, resins, and manufacturing processes are continually being developed that may be applicable to the present invention.

Crank axle 40 of FIG. 3a includes cylindrical bearing surfaces 42a and 42b with corresponding shoulders 44a and 44b for axial location of mating bearing assemblies 22a and 22b that are shown here to be of the cartridge bearing type. Crank axle 40 includes end faces 48a and 48b and internally threaded bores 50a and 50b for threadable mating with corresponding crank bolts (not shown) that serve to fasten the corresponding crank arms to the crank axle 40. Crank axle 40 is shown here to be of hollow cylindrical geometry, including a through bore 52, which is the preferred design. However, it is also envisioned that the bore 52 of the crank axle may alternatively include internal closed-off portions or may be filled with low-density material such as foam. A further alternative design may be of generally solid construction.

It should be noted that the crank axle 40 is a continuous crank axle that extends to pass through the two axially spaced radial bearing assemblies 22a and 22b. This is the preferred arrangement, since it permits continuous and uninterrupted structural geometry to extend between these radial supporting locations. This serves to minimize or eliminate any structural interruptions or weaknesses in this highly stressed region. This is in contrast to split axle designs where the discontinuous crank axle is split or otherwise connected together, resulting in a weakened region adjacent the or between the bearing assemblies 22a and 22b. Further, it is preferable that long or continuous fiber reinforcement be utilized in fabrication of the crank axle 40. To maximize structural properties, this continuous fiber may extend, generally without interruption, through the axial length of the continuous crank axle to thereby optimize its structural properties in this highly stressed region.

To provide the optimal structural properties of the crank axle 40, it is generally preferable to design the crank axle to be as large a diameter as geometrical constraints will permit. A larger diameter crank axle 40 may be designed to be lighter and/or have higher structural properties in comparison with a smaller diameter crank axle 40. Given current bicycle frame geometry, it is preferable that the crank axle 40 has an outside diameter in the range of 22 mm to 35 mm.

While the term "hollow" generally connotes an outer structural shell that surrounds a cavity, it is common for advanced composite components to utilize a low-density material, such as foam or other core material to fill or partially fill the cavity. These low-density "core materials" generally work in compression to provide crush strength to the finished component and/or to connect opposite walls of the structural shell. Such core materials may provide increased structural performance when the structural shell is not completely self-supporting. For the purposes of describing the present invention, the term "hollow" may include a cavity filled with a low-density core material.

While fiber-reinforced material has many excellent structural properties, it does not necessarily have high hardness characteristics. Also, depending on the geometry and processing involved, it may be difficult to maintain these elevated structural properties in regions of abrupt geometry changes. For these reasons, it may be advantageous to add pre-formed inserts to the fiber-reinforced crank axle to maintain the desired structural properties or to provide a region of higher hardness. These inserts may simply be subcomponents that are made from fiber reinforced material and then bonded or otherwise joined to the crank axle. These inserts may also be insert-molded with the crank axle during molding of the fiber-reinforced portion. In this case, the matrix resin is adhered to the insert to create an integrally joined connection between the fiber reinforced crank axle portion and the insert portion. Alternatively, it may be preferable to integrally join the insert to the crank axle by adhesively bonding the two subcomponents. To insure a strong joinder, it is generally advisable to provide sufficient bonding surface area of overlap between the two subcomponents. Often, it is desirable to produce these inserts from a lightweight metallic material such as aluminum or titanium. These metallic materials are isotropic and may be easily machined to provide highly detailed geometry and also possess higher hardness than many composite materials. Additionally, hardened steel inserts may be utilized to create an integral bearing race circumferentially surrounding the crank axle.

Figure 3B:
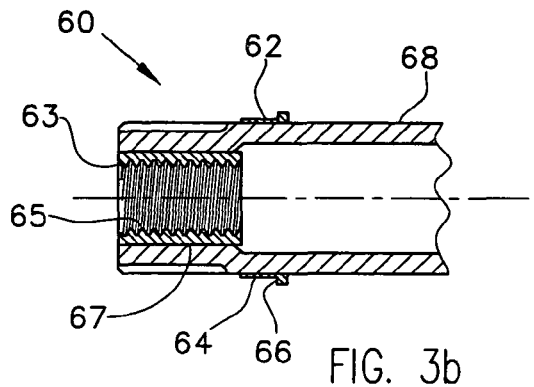
FIG. 3b is a partial cross-section view of a crank axle of fiber-reinforced material, including an external bearing interface insert and an internal threaded insert.
Figure 3C:
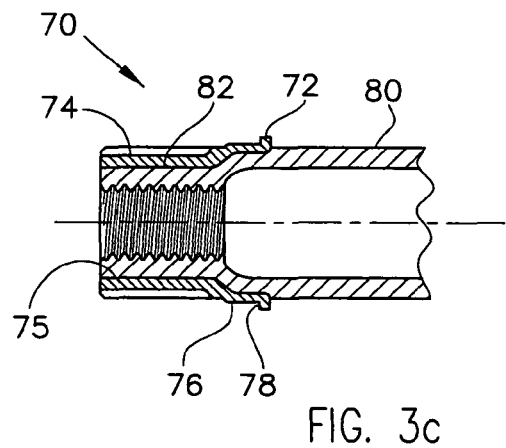
FIG. 3c is a partial cross-section view of a crank axle of fiber-reinforced material, including a combined crank arm interface and bearing interface insert.
Figure 3D:
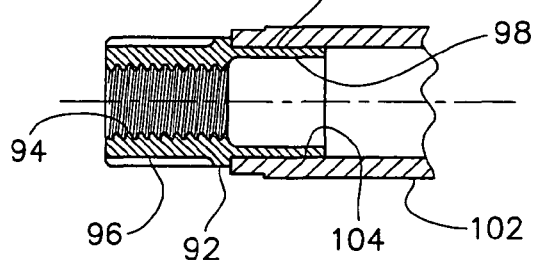
FIG. 3d is a partial cross-section view of a crank axle of fiber-reinforced material, including a crank arm interface insert.

FIGS. 3b-d describe a range of exemplary crank axle configurations that each utilize an insert(s) as previously discussed. FIG. 3b describes crank axle assembly 60 that utilizes an annular bearing insert 62, which includes cylindrical bearing surface 64 and shoulder 66. Fiber-reinforced crank axle body 68 is a generally cylindrical element that extends axially through the annular bearing insert 62. Insert 62 is shown here to be adapted to fitment of the inner race of a bearing assembly (not shown). Alternatively, bearing insert 62 may be designed as an integral bearing race where a bearing, such as a rolling or sliding element, is in direct contact with the bearing insert 62. In this respect, bearing insert 62 may be considered to be a bearing interface insert. Crank axle 60 is otherwise similar to crank axle 40. It should be noted that bearing insert 62 is an external insert that completely circumscribes the outside diameter of the fiber-reinforced crank axle body 68.

Additionally, crank axle assembly 60 includes a threaded insert 63 with internal threads 65 for threadable connection with a fixing bolt (not shown). Threaded insert 63 is integrally adhered to the fiber-reinforced crank axle body 68 at a joining interface 67. It should be noted that threaded insert 63 is an internal insert that is completely circumscribed by the inside diameter of the fiber-reinforced crank axle body 68.

FIG. 3c describes a crank axle assembly 70 that utilizes a spline insert 72, including spline surface 74 and inside diameter 75. Spline insert 72 also includes bearing surface 76 and shoulder 78 for fitment of a bearing assembly (not shown). The fiber reinforced crank axle body 80 is a generally tubular element and includes external surface 82. The pre-formed spline insert 72 is placed in a mold during molding of the crank axle body 80 such that the material of the crank axle body 80 conforms to the inside diameter 75 of the spline insert 72 to result in a matched contour with external surface 82. During this molding process, the molding resin of the crank axle body 80 adhesively bonds to the spline insert 72 at the interface between the external surface 82 and the inside diameter 75. Crank axle 70 is otherwise similar to crank axle 40. Since the spline insert 72 also includes spline surface 74 as a means to connect to the crank arm (not shown) in the conventional manner, it may be considered to be a crank arm interface insert.

FIG. 3d describes a crank axle assembly 90 that utilizes an extension insert 92 that includes geometry to axially extend the fiber-reinforced crank axle body 102. Extension insert 92 includes internal threads 94 for engagement with a fixing bolt (not shown) and external splines 96 for engagement with mating internal splines of a crank arm (not shown) in the conventional manner. Extension insert 92 also includes an axially-extending sleeve 98, which includes a cylindrical outer surface 100. The fiber-reinforced crank axle body 102 is a generally tubular element with inside diameter 104. The extension insert 92 may be adhesively bonded to the crank axle body 102 at the interface between the outer surface 100 and the inside diameter 104. In comparison with the embodiments of FIGS. 3b-c, it should be noted that extension insert 92 is an internal insert that is completely circumscribed by the inside diameter of the fiber-reinforced crank axle body 102.

It should be noted that the continuous circumscribing interfaces described in FIGS. 3b-d are not discontinuous around their mating circumferences, but instead may be considered as closed cylindrical elements. This maintains the structural integrity of both the insert and the crank axle and results in a more structurally efficient joinder between the two portions. Further, it should be noted that the embodiments of FIGS. 3b-d are merely representative of a wide range of possible insert configurations that may be adapted to the present invention. While FIGS. 3b-d are partial views of representative embodiments that describe the left portion of the crank axle, it is understood that a right portion of the crank axle is implied and may be generally symmetrical with the left portion.

While the previous embodiments utilize a crank axle that is a separate component from its associated crank arms, it may be desirable to combine the crank axle with one of the crank arms to create an integral assembly. The fiber reinforced crank axle may be a pre-formed element that is permanently joined to a pre-formed crank arm of metallic or fiber-reinforced composite construction. Alternatively, either the crank arm or the crank axle may be molded to include the corresponding crank arm or crank axle as a pre-formed molding insert. However, it is generally preferable that the integral crank arm be constructed of composite materials and that the crank arm and crank axle be molded together as one contiguous unit.

Figures 4A, 4B:
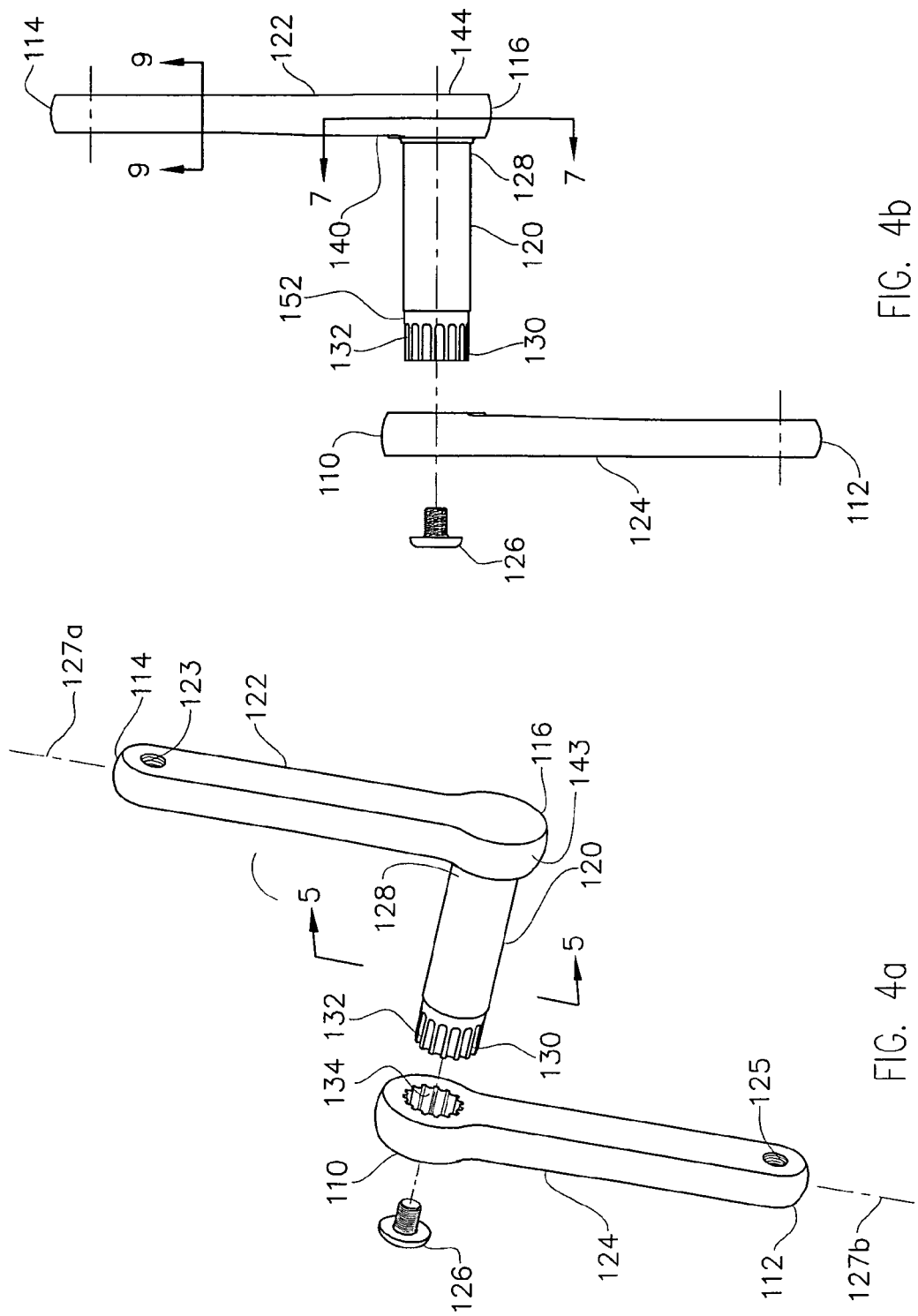

FIGS. 4a-e describe an arrangement where right crank arm 122 is permanently fixed to the right end 128 of crank axle 120 and the left crank arm 124 is removably assembled to the left end 130 of crank axle 120. Left crank arm 124 includes a pedal end 112, located radially outboard from the crank axle 120 and an axle end 110, located proximal to the crank axle 120. Pedal end 112 includes threaded hole 125 for mounting of a left pedal (not shown) and axle end 110 includes internal splines 134 to mate with external splines 132 of the crank axle 120. The axle end 110 of the left crank arm 124 is secured to crank axle 120 via crank bolt 126 in the conventional manner. Right crank arm 122 includes a pedal end 114, located radially outboard from the crank axle 120 and an axle end 116, located proximal to the crank axle 120. Pedal end 114 includes threaded hole 123 for mounting of a right pedal (not shown) and axle end 116 is integrally connected to the crank axle 120. Crank arm axis 127a extends along the longitudinal length of the right crank arm 122 between threaded hole 123 and crank axle 120 in a generally radial direction. Similarly, crank arm axis 127b extends along the longitudinal length of the left crank arm 124 between threaded hole 125 and crank axle 120 in a generally radial direction. As shown in FIGS. 4c-e, right crank arm 122 is a hollow element with a fiber reinforced structural shell 142 and an internal cavity 136. The shell 142 includes axially inboard wall 140 and axially outboard wall 144. The sidewall 143 of the right crank arm 122 extends between the inboard wall 140 and the outboard wall 144. Crank axle 120 is a hollow tubular element with an internal cavity 138 and a tubular wall 146, a portion of which intersects and extends through the inboard wall 140 to join with the outboard wall 144. While FIGS. 4a-d show the crank axle 120 integrally connected to the right crank arm 122, it is understood that the crank axle 120 may alternatively be integrally connected to the left crank arm 124.

FIG. 4c shows that crank axle 120 also utilizes insert 152, which includes the internal threads 154 for engagement of the fixing bolt 126 and the external splines 132 for engagement with internal splines 134 of the left crank arm 124. Insert 152 also includes a sleeve portion 156 that is adhered or otherwise integrally joined to the inside diameter 157 of the tubular wall 146. End face 158 of the crank axle 120 is exposed to provide a radially extending shoulder for axial location of a bearing assembly (not shown).

It may be seen in FIG. 4c that both the crank axle 120 and the right crank arm 122 are made up of plies or layers of composite material, preferably molded from prepreg, a composite material in which reinforcement fibers, such as carbon fibers, are pre-impregnated with uncured resin, such as epoxy resin. This prepreg material is usually supplied in sheet form to include unidirectional or woven fibers, which may be wrapped and formed to achieve the desired pre-formed shape. This pre-form is then placed in a mold (not shown) and heat and compaction pressure are applied to the prepreg to consolidate the plies and to cure out the resin, thus creating a hardened and molded structural component. Compaction pressure may be created through a variety of methods well known in industry. In this configuration, compaction pressure may be created through the utilization of pressurized bladders placed within internal cavities 136 and 138 during the molding process.

Some of the plies of the crank axle 120 are flared to overlap with mating plies of the inboard wall 140 as shown in FIG. 4c-e. Other plies of the crank axle 120 extend through the inboard wall 140 and internal cavity 136 and are flared to overlap with outboard wall 144. Similarly, plies of the crank arm 122 may be extended to overlap with the plies of the crank axle 120. Further, additional plies may be arranged to span across the juncture between the crank axle 120 and the right crank arm 122. In this way, plies of continuous fiber are interleaved and extend to span across the joint or interface between the crank axle 120 and the right crank arm 122, thus significantly reinforcing the integral connection between these two components. Foam plug 148 is located in the internal cavity 138 adjacent the right crank arm 122. During molding, a first internal bladder (not shown) is placed within internal cavity 136 and a second internal bladder (not shown) is placed within cavity 138. This entire preform is placed within a mold cavity (not shown) that defines the external geometry of the right crank arm 122 and the crank axle. The first bladder is wrapped around the crank axle 120 in the region adjacent the right crank arm and the foam plug 148 serves to maintain the internal shape of the crank axle 120 during molding. The mold is then heated and the bladders are pressurized with air such that the plies are consolidated and the resin is cured. Such a bladder-molding process is well known in industry. The crank axle 120 and the crank arm 122 are thus co-molded and integrally joined. It may also be seen in FIGS. 4d-e that crank arm 122 also includes an internal wall or septum 150 that spans between inboard wall 140 and outboard wall 144. This septum 150 serves to provide a rigid link between the inboard wall 140 and outboard wall 144, thus providing greater structural integrity to the right crank arm 122. Internal cavity 136 is also shown to extend to wrap around the crank axle 120 as shown in FIGS. 4c-d.

While the bladder molding process as described above may be the preferred molding method to produce the crank arm 122 and crank axle 120 assembly, several alternate molding methods may be employed, including resin transfer molding, filament winding, trapped silicone molding. Further, while hollow internal cavities 136 and 138 are shown here, these cavities may alternatively be filled with foam or other low-density material.

Figure 5B:
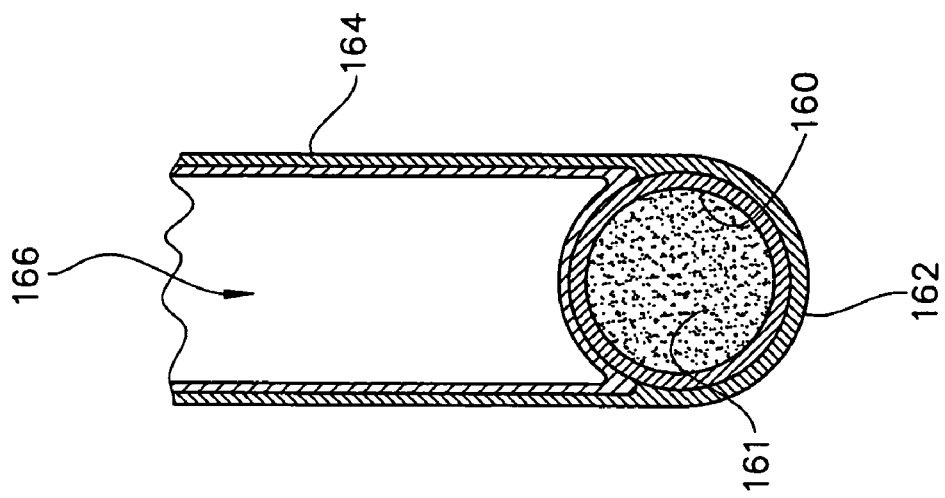
FIG. 5b is a partial cross section view of the embodiment of FIG. 5a in a view roughly corresponding to FIG. 4d.
Figure 5A:
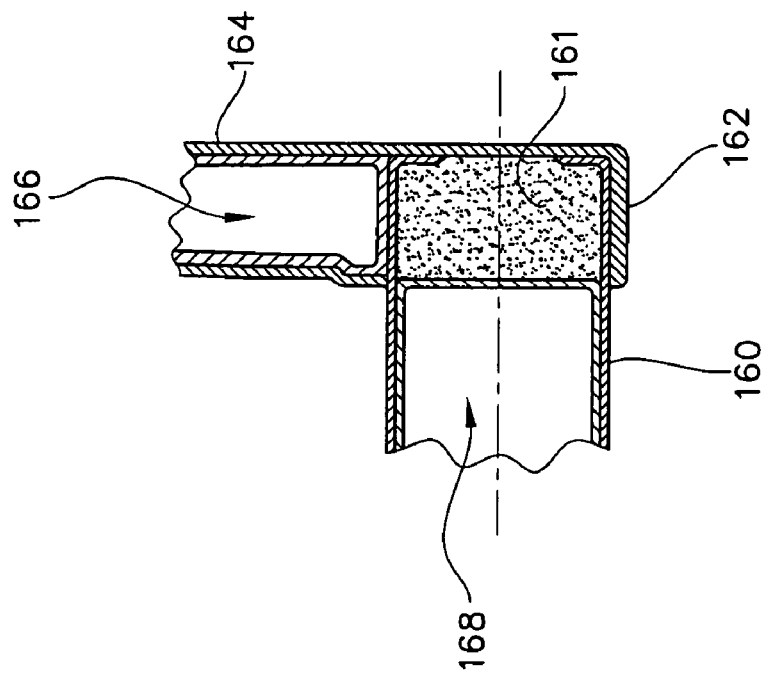
FIG. 5a is a partial cross section view of an additional embodiment of the present invention in a view roughly corresponding to FIG. 4c.

While FIGS. 4c-d shows internal cavity 136 to wrap around the crank axle 120, it is also envisioned that a portion of the wall of the crank axle may be shared with a portion of the wall of the crank arm 122 as shown in FIGS. 5a-b. FIG. 5a roughly corresponds to FIG. 4c and shows the plies of the crank axle 160 to be collinear and nested to overlap with the plies of the sidewall 162 of right crank arm 164. In contrast to the embodiment of FIGS. 4a-e, internal cavity 166 of the right crank arm 164 does not wrap completely around the crank axle 160, nor does it include a septum. It may be seen in FIGS. 5a-b that plies of the crank axle 160 are interleaved with plies of the crank arm 164 and vice-versa. Crank axle 160 includes internal cavity 168 and foam plug 161, which serves to support the surrounding plies of fiber-reinforced material during molding and to provide compressive and crush strength to the crank axle 160 in this region. Bladders may be placed within internal cavities 168 and 166 and the molding process previously described may be utilized to co-mold and integrally connect the crank axle 160 and right crank arm 164.

As an alternative to the co-molded construction described in the embodiments of FIGS. 4a-e and FIGS. 5a-b, it is also envisioned that the crank arm and/or the crank axle may be pre-formed elements. For instance, the crank axle may be a preformed element that serves as an insert in a crank arm molding process. Thus the crank arm is molded to overlap and adhere with at least a portion of the pre-formed crank axle. When the crank arm is solidified, an integral connection between the crank arm and the crank axle is thus created. Alternatively, the crank arm may be a pre-formed element that serves as an insert in a crank axle molding process. Thus the crank arm is molded to overlap and adhere with at least a portion of the pre-formed crank arm. When the crank axle is solidified, an integral connection between the crank axle and the crank arm is thus created. A further alternative may utilize both a pre-formed crank axle and a pre-formed crank arm. In this case, the pre-formed crank axle and a pre-formed crank arm may be adhesively bonded or otherwise joined together at an interface between the two to create an integral connection between the two pre-formed components.

Whereas the embodiment of FIGS. 4a-d show the geometry of the crank axle 120 to intersect with the geometry of the crank arm 122, the embodiment of FIGS. 6a-d show the cylindrical walls 184 of the crank axle 180 to extend continuously to form the perimeter sidewalls 186 of the right crank arm 182. Thus the integral combination of the crank axle 180 and the crank arm 182 may be viewed as a continuous L-shaped tubular element, including a bent region 188. In the case where these components are bladder-molded, a single continuous bladder may be utilized to form both the crank axle 180 and the crank arm 182. It is also preferable to create a continuous septum 190 that extends along the length of the right crank arm 182 to rigidly connect the inboard wall 192 and the outboard wall 194 to prevent independent movement between the opposing wall portions and thereby increase the structural integrity of the right crank arm 182. Septum 190 further extends through bent region 188 and through the crank axle 180 to provide reinforcement to these portions as well.

Crank axle 180 axle also includes an annular pre-formed flange insert 193 that includes an axially extending cylindrical bearing portion 195 for mounting of a cartridge bearing assembly (not shown) and a radially extending flange portion 196 with threaded holes 198 for connection with the drive sprocket (not shown) commonly associated with crank arms. It is understood that flange portion 196 merely shows one representative method for connecting a drive sprocket to the crank arm 182. A wide range of alternate methods may be substituted, including integrally molding a flange to the crank axle 180 or to the crank arm 182 for connection with the drive sprocket(s). Crank axle 180 also includes external splines 187 for engagement with internal splines 189 of left crank arm 185 in the manner previously described.

FIGS. 7a-e describe an embodiment where both the right crank arm 202 and the left crank arm 204 are each integrally connected to the crank axle 200 in a manner similar to that described in FIGS. 6a-d. Thus the crank assembly 206 includes the integral combination of the crank axle 200, the right crank arm 202 and the left crank arm 204 and may be viewed as a continuous S-shaped tubular element, including bent region 208 between the right crank arm 202 and the crank axle 200 and bent region 210 between the left crank arm 204 and the crank axle 200. It is also preferable to create a continuous septum 220 that extends through crank axle 200 and bent regions 208 and 210 and through at least a portion of right crank arm 202 and left crank arm 204. This may be considered as one of the lightest and most structurally efficient crank assembly arrangements. Crank axle 200 also includes external bearing inserts 212a and 212b for mounting of cartridge bearing assemblies (not shown).

Figure 8:
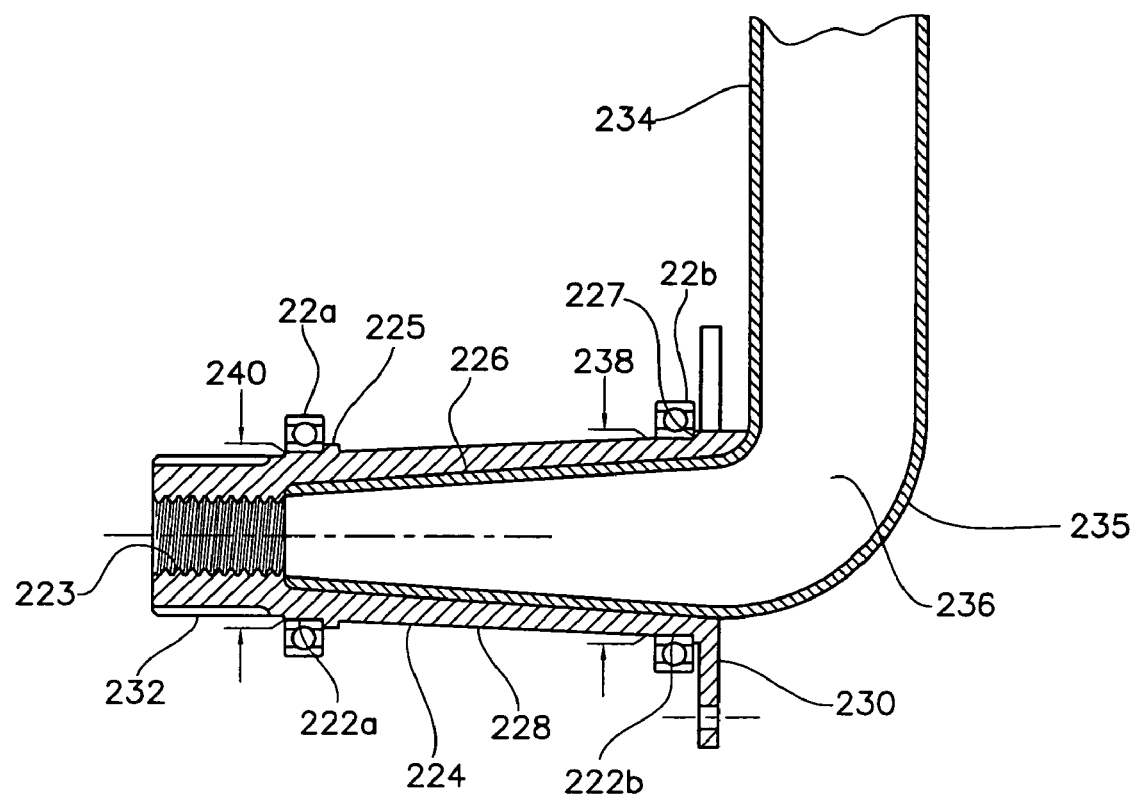
FIG. 8 is a radial cross section view of an additional embodiment of the present invention, including an integral crank arm and crank axle, and including supporting bearings and a reinforcement insert.

FIG. 8 describes an embodiment similar to FIG. 6b, however the crank axle 224 is a hybrid crank axle that is composed of fiber-reinforced portion 226 and an insert portion 228. Thus the fiber reinforced portion 226 and the insert portion 228 are overlapped and adhered to each other along their contacting interface that extends over essentially the entire length of the crank axle 224, resulting in an integral joinder between the two. Having such a large overlapping surface are between the insert portion 228 and the fiber reinforced portion 226 permits a larger adhered interface are for a stronger integral connection between the two. Further, insert portion 228 provides reinforcement of the fiber-reinforced portion 226, and vice-versa, providing additional strength in this highly stressed region. To this degree, insert portion 228 may be considered to be a reinforcement insert. Insert portion 228 includes bearing surfaces 222a and 222b and extends between supporting bearing assemblies 22a and 22b. Insert portion 228 also includes a spider 230 for fitment of the drive sprockets (not shown) and a splined portion 232 for fitment of a left crank arm (not shown) and a threaded hole 223 to mate with a fixing bolt (not shown). Insert portion 228 also includes shoulder flange 225 for axial location of bearing assembly 22a and shoulder 227 for axial location of bearing assembly 22b. Fiber-reinforced portion 226 is contiguous with the right crank arm 234 and is a hollow element with internal cavity 236. The cylindrical walls of the fiber-reinforced portion 226 extend continuously to form right crank arm 234, including bent portion 235. Thus, the crank axle 224 is integral and contiguous with the right crank arm 234.

It should be noted that the interface between the insert portion 228 and the fiber-reinforced portion 224 is a tapered conical surface with the larger diameter adjacent the contiguous right crank arm 234. This permits the maximum possible diameter of the fiber-reinforced portion 226 to provide the highest strength in the most highly stressed region adjacent the junction between the crank axle 224. Likewise, this permits the wall thickness of the insert portion 228 to be thicker in the region adjacent the left crank arm (not shown). The outside diameter of bearing surface 222b corresponds with the inside diameter 238 of bearing assembly 22b. Likewise, the outside diameter of bearing surface 222a corresponds with the inside diameter 240 of bearing assembly 22a. It should be noted that inside diameter 238 is larger than the inside diameter 240, thus permitting a still larger diameter of the fiber-reinforced portion 226 and further increasing the strength in the highly stressed region adjacent the junction between the crank axle 224. Thus the inside diameter 238 of bearing assembly 22b is larger than the inside diameter 240 of bearing assembly 22a. This permits the shoulder flange 225 to be assembled through the inside diameter 238 of the bearing assembly 22b, yet still be sized to have axial locating engagement with the inner race of the smaller bearing assembly 22a.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, arrangement of parts and details of operation. For example:

The reinforcement insert portion 228 of FIG. 8 is shown to be an external insert that is surrounded by a fiber-reinforced portion 226 of the crank axle. Additionally or alternatively, it is also envisioned that a reinforcement insert may be an internal insert that is at least partially surrounded by a fiber-reinforced portion of the crank axle.

The inserts described in FIGS. 3a-d and FIG. 8 show a series of inserts that have a continuous circumscribing joining interface with their corresponding fiber-reinforced crank axle portions. However it is also envisioned that this interface may be discontinuous or interrupted such that this joining interface is not continuously circumferential about the axial axis. For example, the insert may contain a series of axially extending projections with gaps in between. Thus, a joining interface between the projections and the fiber-reinforced crank axle portion would be interrupted by these gaps.

The embodiments of FIGS. 4a-e, 5a-b, 6a-d, 7a-f, 8 all describe an integrated crank arm and crank axle combination. It has been described how the crank arm and crank axle may be co-molded to create this integrated unit. However, it is also envisioned that the crank axle and/or the crank arm may be pre-formed elements that are integrally joined together.

The embodiment of FIGS. 6a-d describes a flange adapted to connect a drive sprocket to the right crank arm. It is also envisioned that the drive sprocket may instead be directly or indirectly connected to the left crank arm or to the crank axle.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A bicycle crankshaft assembly comprising:
   a crank axle including an axial axis, a first axle end, and a second axle end axially opposed to said first axle end;
   a first crank arm connected to said crank axle at a first crank arm interface adjacent said first axle end;
   a second crank arm connected to said crank axle at a second crank arm interface axially spaced from said first crank arm interface;
   a first bearing surrounding said crank axle adjacent said first axle end for rotation of said crank axle about said axial axis;
   a second bearing surrounding said crank axle for rotation of said crank axle about said axial axis,
   wherein:
   said second bearing is axially spaced from said first bearing;
   said first crank arm includes a first crank arm axis and said second crank arm includes a second crank arm axis;
   said crank axle includes reinforcement fibers for structural reinforcement of said crank axle; and
   said fiber reinforced crank axle is an integral one-piece crank axle that passes through said first bearing and extends to said second bearing.

2. A bicycle crankshaft assembly according to claim 1, wherein said first bearing is located axially inboard from said first crank arm interface and said second bearing is located axially inboard from said second crank arm interface.

3. A bicycle crankshaft assembly according to claim 1, wherein said crank axle is a continuous element that extends through said first bearing and extends adjacent said second bearing.

4. A bicycle crankshaft assembly according to claim 1, wherein said crank axle is a continuous element that extends through said first bearing and extends through said second bearing.

5. A bicycle crankshaft assembly according to claim 1, wherein a first portion of said reinforcement fibers are aligned to extend in a helical direction about said axial axis.

6. A bicycle crankshaft assembly according to claim 5, wherein a first portion of said reinforcement fibers are aligned to extend in a helix angle of approximately 45 degrees and wherein a second portion of said reinforcement fibers are aligned to extend in a helical direction with a helix angle of approximately 135 degrees.

7. A bicycle crankshaft assembly according to claim 1, wherein at least a portion of said reinforcement fibers are generally continuous reinforcement fibers.

8. A bicycle crankshaft assembly according to claim 7, wherein at least a portion of said continuous reinforcement fibers pass adjacent said first bearing and extend to pass adjacent said second bearing.

9. A bicycle crankshaft assembly according to claim 7, wherein at least a portion of said continuous reinforcement fibers extend to at least one of said first crank arm interface and said second crank arm interface.

10. A bicycle crankshaft assembly according to claim 1, wherein at least a portion of said reinforcement fibers are carbon fibers.

11. A bicycle crankshaft assembly according to claim 1, wherein at least a portion of said reinforcement fibers are within a polymer matrix.

12. A bicycle crankshaft assembly according to claim 1, including a pre-formed insert integrally joined to said crank axle.

13. A bicycle crankshaft assembly according to claim 12, wherein said insert is a bearing interface insert to interface with at least one of said first bearing and said second bearing.

14. A bicycle crankshaft assembly according to claim 12, wherein said insert is a reinforcement insert, wherein said reinforcement insert serves to structurally reinforce said crank axle.

15. A bicycle crankshaft assembly according to claim 12, wherein said insert is an external insert that circumferentially surrounds at least a portion of said reinforcement fibers.

16. A bicycle crankshaft assembly according to claim 1, wherein said crank axle includes a shoulder for axial location of one of at least one of said first bearing and said second bearing.

17. A bicycle crankshaft assembly according to claim 1, wherein said crank axle constitutes a structurally hollow element with a structural outer shell and an internal cavity, wherein said internal cavity extends axially through said first bearing and said second bearing.

18. A bicycle crankshaft assembly according to claim 1, wherein said crank axle constitutes a structurally hollow element with a structural outer shell and an internal cavity, wherein said internal cavity includes a structural septum wall to bridge across generally opposing walls of said structural outer shell.

19. A bicycle crankshaft assembly according to claim 1, wherein said first crank arm is integral with said crank axle at said first crank arm interface.

20. A bicycle crankshaft assembly according to claim 19, wherein said first crank arm is a hollow crank arm with an internal cavity and a structural outer shell.

21. A bicycle crankshaft assembly according to claim 19, wherein at least a portion of said reinforcement fibers are within a polymer matrix and wherein said first crank arm and said crank axle are co-molded as a singular element.

22. A bicycle crankshaft assembly according to claim 19, wherein said crank arm includes reinforcement fibers and wherein at least one of (1) said reinforcement fibers of said crank axle extend to overlap at least a portion of said first crank arm and (2) said reinforcement fibers of said first crank arm extend to overlap at least a portion of said crank axle.

23. A bicycle crankshaft assembly according to claim 19, wherein said crank axle constitutes a structurally hollow element with a structural outer shell and an internal cavity and wherein said first crank arm constitutes a structurally hollow element with a structural outer shell and an internal cavity and wherein said outer shell of said crank axle extends continuously with the outer shell of said crank arm.

24. A bicycle crankshaft assembly according to claim 23, including a bent region at the transition between said first crank arm and said crank axle.

25. A bicycle crankshaft assembly according to claim 19, wherein said crank axle constitutes a structurally hollow element with a structural outer shell and an internal cavity and wherein said first crank arm constitutes a structurally hollow element with a structural outer shell and an internal cavity and wherein said internal cavity of said crank axle communicates with said internal cavity of said first crank arm.

26. A bicycle crankshaft assembly according to claim 25, including a bent region at the transition between said first crank arm and said crank axle, including a septum wall extending within said hollow cavity of said first crank arm and said hollow cavity of said crank axle in said bent region.

27. A bicycle crankshaft assembly according to claim 25, wherein said first crank arm includes a structural septum wall and wherein said crank axle includes a structural septum wall and wherein said septum wall of said crank axle is generally contiguous with said septum wall of said first crank arm.

28. A bicycle crankshaft assembly according to claim 19, wherein said crank axle constitutes a structurally hollow element with a structural outer shell and an internal cavity, wherein said internal cavity includes a structural septum wall to bridge across generally opposing walls of said structural outer shell.

29. A bicycle crankshaft assembly according to claim 19, wherein said first crank arm constitutes a structurally hollow element with a structural outer shell and an internal cavity, wherein said internal cavity includes a structural septum wall to bridge across generally opposing walls of said structural outer shell.

30. A bicycle crankshaft assembly according to claim 19, wherein said first crank arm is a hollow crank arm with an internal cavity and a structural outer shell, including a first structural wall and a second structural wall, wherein said second structural wall is axially outboard from said first structural wall, and including a structural septum wall bridging between said first structural wall and said second structural wall and extending generally parallel said corresponding crank arm axis.

31. A bicycle crankshaft assembly according to claim 1, including a circumferential joining interface between said insert and said crank axle, wherein said joining interface at least partially circumscribes said crank axle about said axial axis.

32. A bicycle crankshaft assembly according to claim 1, wherein said first crank arm is integral with said crank axle adjacent said first axle end and wherein said second crank arm is integral with said crank axle adjacent said second axle end.

33. A bicycle crankshaft assembly according to claim 32, wherein said crank axle is a structurally hollow element with a structural outer shell and an internal cavity and wherein said first crank arm is a structurally hollow element with a structural outer shell and an internal cavity and wherein said internal cavity of said crank axle communicates with said internal cavity of said first crank arm.

34. A bicycle crankshaft assembly according to claim 33, wherein said first crank arm includes a structural septum wall and wherein said crank axle includes a structural septum wall and wherein said septum wall of said crank axle is generally contiguous with said septum wall of said first crank arm.

35. A bicycle crankshaft assembly according to claim 33, wherein said second crank arm is a structurally hollow element with a structural outer shell and an internal cavity and wherein said internal cavity of said crank axle communicates with said internal cavity of said second crank arm.

36. A bicycle crankshaft assembly according to claim 32, wherein said first crank arm, said second crank arm and said crank axle constitute a generally S-shaped crankshaft assembly.

37. A bicycle crankshaft assembly according to claim 32, wherein said crank axle constitutes a structurally hollow element with a structural outer shell and an internal cavity and wherein said first crank arm constitutes a structurally hollow element with an internal cavity and a structural outer shell and wherein said outer shell of said crank axle extends continuously with the outer shell of said crank arm.

38. A bicycle crankshaft assembly according to claim 37, including a bent region at the transition between said first crank arm and said crank axle.

39. A bicycle crankshaft assembly according to claim 1, wherein at least one of said first crank arm and said second crank arm is a hollow crank arm with an internal cavity and a structural outer shell, including an axially inboard wall and an axially outboard wall with a structural septum wall bridging between said inboard wall and said outboard wall and extending generally parallel said corresponding crank arm axis.

40. A bicycle crankshaft assembly according to claim 1, wherein said first crank arm axis is generally radially opposed to said second crank arm axis.

41. A bicycle crankshaft assembly according to claim 1, wherein at least one of said first and second bearing are situated in first and second bearing assemblies respectively.

* * * * *